United States Patent [19]

Agins

[11] 4,095,846
[45] Jun. 20, 1978

[54] WHEEL WITH MOLDED TIRE FOR CARTS

[76] Inventor: David B. Agins, 5520 Burnett Ave., Van Nuys, Calif. 91411

[21] Appl. No.: 717,916

[22] Filed: Aug. 26, 1976

[51] Int. Cl.² .............................................. B60B 5/02
[52] U.S. Cl. ............................ 301/37 R; 301/63 PW; 152/323; 152/380
[58] Field of Search .............. 301/5 R, 5.3, 5.7, 63 R, 301/63 PW, 65, 64 R, 64 SD, 37 R, 37 P; 152/323–324, 7, 379.1, 380; 46/221; D12/204, 207–208, 135

[56] References Cited

U.S. PATENT DOCUMENTS

| 661,965 | 11/1900 | Enlind | 152/379.1 X |
| 1,396,443 | 11/1921 | Lachman | 301/64 SD |
| 3,214,220 | 10/1965 | Foster et al. | 301/63 PW |
| 3,578,812 | 5/1971 | Taussig | 301/63 PW |
| 3,604,756 | 9/1971 | Gruber | 301/63 PW X |
| 3,843,202 | 10/1974 | Lacerte | 301/63 PW |

FOREIGN PATENT DOCUMENTS

| 520,958 | 1/1956 | Canada | 301/5.7 |
| 1,175,133 | 11/1958 | France | 301/5.7 |
| 360,324 | 1/1921 | Germany | 301/65 |
| 856,560 | 11/1952 | Germany | 301/63 PW |
| 33,734 | 12/1964 | Germany | 152/323 |
| 1,301,652 | 1/1973 | United Kingdom | 152/323 |

Primary Examiner—Robert B. Reeves
Assistant Examiner—Charles A. Marmor
Attorney, Agent, or Firm—Wm. Jacquet Gribble

[57] ABSTRACT

A central hub which may contain a bearing or a bushing has a central radial web with reinforcing spokes on each side of the web. The web terminates in an outer rim. An inner rim slightly spaced from the outer rim extends from each side of the web and defines annular cavities on each side of the web. At arcuately spaced intervals in the web between the rims are small perforations. A tire is molded about the outer rim and extends into the annular cavities between the outer and inner rim and through the perforations to form a mechanically integral structure with the web and rims. Additionally thread guard discs or covers may shroud the space between the hub where it protrudes axially beyond the web and the inner face of the inner rim. The covers may be supported either by the bearings in the central bearing apertures of the hub or from the outer faces of the hub itself.

1 Claim, 4 Drawing Figures

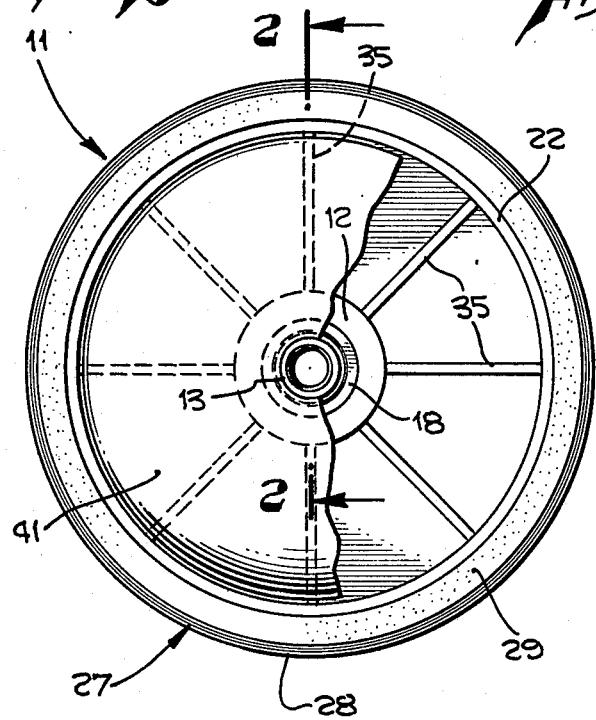
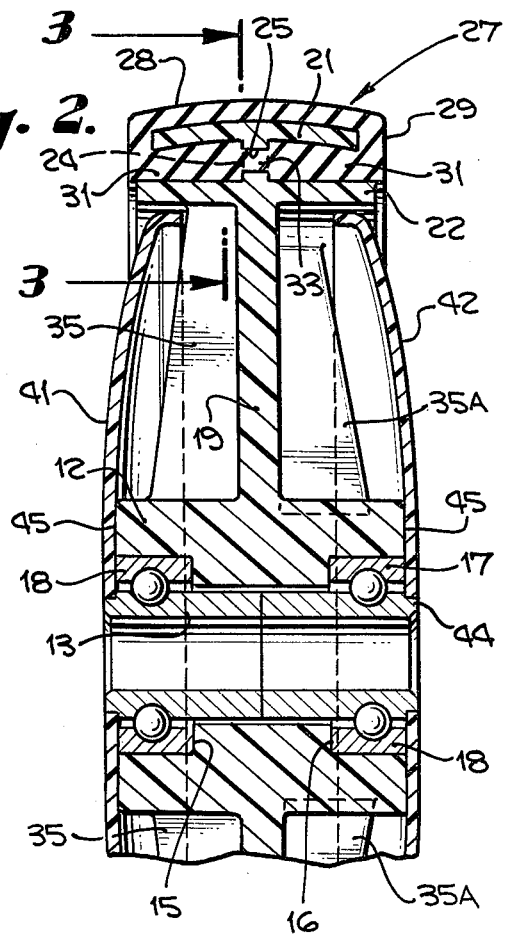
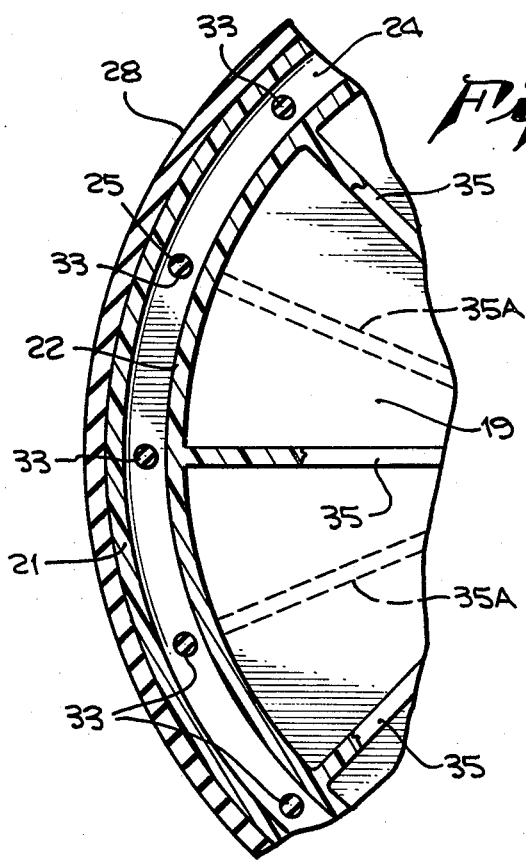
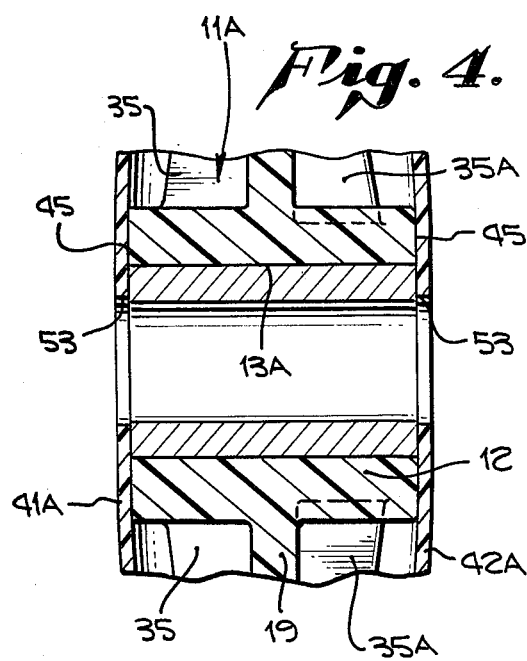

WHEEL WITH MOLDED TIRE FOR CARTS

BACKGROUND OF THE INVENTION

The invention relates to small wheels such as the cast wheels used for carts, dollies, hand trucks and grocery shopping carts and more particularly to wheels for such carts in which the wheel has a bearing and a tire on the rim of the wheel. Polyurethane has become recognized as superior in wearing qualities to rubber, neoprene and other rubber-like materials commonly used for wheels both as to resistance to abrasion and resistance to weather deterioration. However, there is a difficulty in that polyurethane does not readily bond to metals or to plastics having the strength and the shock resistance of metal. For instance, both polyethylene and polypropylene are joined to polyurethane with great difficulty either by sonic, solvent, or heat induced joinder techniques.

It is therefore an objective of the invention to provide a wheel wherein a hub and rim may be compounded of one material and the tire of the wheel be polyurethane or another like material. Of further objective is to provide a wheel wherein the polyurethane tire is mechanically locked to the hub and rim such that repeated abrasions and other shocks do not separate the tire from the rim. It is a still further objective of the invention to provide a wheel wherein the hub and rim may be easily molded and thereafter joined to a polyurethane tire.

These objectives are obtained in unique fashion by providing a wheel which has substantially concentric inner and outer rims supported from a hub by a web-like central disc.

SUMMARY OF THE INVENTION

The invention contemplates a wheel for mounting on a spindle axle which comprises a central hub with a bearing aperture in the hub and a radial web extending from the hub to an outer rim which extends parallel to the bearing aperture axis from each side of the web. An inner rim spaced from the outer rim and substantially concentric therewith extends generally parallel to the bearing aperture axis from each side of the rim. A molded tire covers the outer rim and has integral inner rings on either side which fill the space between the inner and outer rim. Ring ties extend from each of the rings through the web at intervals and are integral with the ring on each side of the web.

In a preferred embodiment a pair of roller bearings is pressed into the bearing aperture and thread-guards attached to the outer spindle of each bearing. The guards fill the annular space between the inner rim and the hub and mask the outer bearing race.

Preferably the hub, web and rims are of polypropylene while the tire is of polyurethane with high resistance to abrasion, and can be economically molded in place upon a prior mass produced wheel of either plastic or suitable metal well below the cost of conventional wheels for carts and dollies and hand-trucks. The wheel adapts both to roller bearings, needle bearings and to sleeve bearings, and is capable of performing under a variety of environmental conditions.

These and other advantages of the invention are apparent from the following detailed description and drawing.

BRIEF DESCRIPTION OF THE DRAWING

FIG. 1 is a side elevational view of a wheel in accordance with the invention, partly broken away;

FIG. 2 is a fragmentary sectional elevation taken along line 2—2 of FIG. 1;

FIG. 3 is a fragmentary sectional elevation to a larger scale taken along line 3—3 of FIG. 2; and FIG. 4 is a fragmentary sectional elevation of an alternate embodiment of the invention utilizing a bushing.

In the Figures like parts are indicated by like reference characters.

DESCRIPTION OF THE PREFERRED EMBODIMENTS

In FIGS. 1 through 3, wheel 11 has a central hub 12 which has a stepped bore 13 defining a bearing aperture. The steps 15, 16 of the bore define shoulders against which an outer race 17 of each bearing 18 of a pair of roller bearings is registered.

A central web 19 extends from hub 12 to an outer rim 21 which, as is clear from FIG. 2, is slightly arcuate in configuration in transverse cross-section. Web 19 has a narrow portion 24 between outer rim 21 and an inner rim 22 which is substantially concentric with outer rim 21 although not arcuate but cylindrical in configuration on each side of web 19. Narrow portion 24 of web 19 has a plurality of apertures such as the aperture 25 of FIG. 2 which are arcuately spaced above the web between the inner and outer rims. A tire 27, which is molded to wheel 11, has a curving outer periphery 28 and relatively straight side walls 29 which connect the outer peripheral section to inner tire rings 31. A tire ring 31 is molded on each side of the web integrally with outer periphery 28 and the rings are connected by ring ties 33 which extend through apertures 25 of the narrow portion 24 of the web.

The arcuate spacing of the ties 33 is evident from FIG. 3 wherein the outer curved periphery 28, which may be 3/32 inch thick on a wheel of approximately 4 inches in diameter is seen to be of the same material as ties 33. The inner tire rings 31 are not shown in FIG. 3 so that the ties 33 are evident in their relationship one to another and in their relationship to a plurality of spokes 35 which extend from hub 12 on each side of web 19 to rigidify the web and support the inner rim 22.

FIG. 3 shows that the spokes are staggered on each side of the web. The spokes 35A on the backside of the web as seen in FIG. 3 being spaced arcuately mid-way between the spokes 35 on the near face of web 19.

While the ring ties are shown as being aligned with the spokes in FIG. 3, the invention is not so limited. However, such construction is desirable since the placement of apertures between spokes might tend to weaken the narrow web portion 24 in the areas where the spokes do not give support to inner rim 22.

Returning to FIG. 2, it can be seen that the arcuate shape of the outer peripheral portion 28 of the tire results in a narrowing of the space between the inner and outer rims near the exterior of the rims. Therefore the inner ring on each side of the narrow web portion has a wedge shape which resists displacement of the inner ring, and therefore the polyurethane tire, from the rims. The resistance of removal is of course aided by the ring ties 33.

By utilizing unlike materials for the tire and the wheel hub and rims in the configuration disclosed by this application materials which are best suited to each function may be used and joined despite dis-similarities in their chemistry which preclude normal bonding techniques. The configuration also lends itself to protective guards such as the curved discs 41, 42 on each side of the wheel which fill the space between the hub periphery and the inner rim 22 as well as the space between the inner and outer races of the bearings 15, 16. The guards are each secured to an outwardly protruding shoulder 44 of each ball bearing and are spaced from the faces 45 of the hub such that the guards need not turn with the wheel but remain stationary, as do the inner races and axle (not shown) for the wheel.

FIG. 4 illustrates a wheel 11A which is an alternate embodiment of the invention wherein a bore 13A defines a bearing aperture which extends on uninterruptedly through the hub to accept a sleeve bearing or bushing 51 which extends from face 45 to face 45 of a hub 12. The saucer shaped guards 41A, 42A are fixed to the hub and have central apertures 53 through which the axle (not shown) of the wheel extends. The aperture walls clear the axle and the covers in the embodiment of FIG. 4 turn with the wheel about the axle.

The illustrative embodiments of the invention show wheels which are not only easy and economical to fabricate but which perform as well as conventional wheels and far exceed conventional wheels in durability. The wheels may be manufactured by conventional techniques and may be used on new carts or be used as replacements on carts whose wheels have deteriorated.

Variations within the scope of the invention will occur to those skilled in this particular art. It is therefore desired that the scope of the invention be measured by the appended claims rather than the illustrative embodiments disclosed above.

I claim:

1. A wheel for mounting on a spindle axle and comprising a central hub, a bearing aperture through the hub, a radial web extending centrally of the hub, an outer rim extending concentric with a bearing aperture from each side of the web, an inner rim spaced from the outer rim and extending concentric with the bearing aperture from each side of the web; a molded tire tread covering the outer rim, a tire inner ring integral with the tread and filling the space between rims, and ring ties extending through the web at intervals and integral with the inner ring on each side of the web; said tire tread being of a polyurethane plastic and said rims and hub being of a polypropylene plastic; radial spokes arcuately spaced on each side of the web from the hub to the inner rim, the spokes on one side of said web being in a different transverse plane from a spoke in the opposite side of the web; a cover disc on each side of the wheel and covering substantially the space between the bearing aperture and the inner rim, and a bearing having inner and outer races in each end of the hub bearing aperture, said cover discs each being secured to an inner bearing race.

* * * * *